Dec. 28, 1965   H. SCHWAB ETAL   3,225,470
LIGHT-REACTANT DISPLAY DEVICES
Filed March 6, 1964   3 Sheets-Sheet 1

INVENTORS
HELMUT SCHWAB
WILLIAM R. HORST
CAROL STOWE VAN VOORHIS
STANLEY F. COIL

BY

THEIR ATTORNEYS

INVENTORS
HELMUT SCHWAB
WILLIAM R. HORST
CAROL STOWE VAN VOORHIS
STANLEY F. COIL

BY
THEIR ATTORNEYS

Dec. 28, 1965  H. SCHWAB ETAL  3,225,470
LIGHT-REACTANT DISPLAY DEVICES
Filed March 6, 1964  3 Sheets-Sheet 3

INVENTORS
HELMUT SCHWAB
WILLIAM R. HORST
CAROL STOWE VAN VOORHIS
STANLEY F. COIL

BY

THEIR ATTORNEYS

United States Patent Office 3,225,470
Patented Dec. 28, 1965

3,225,470
LIGHT-REACTANT DISPLAY DEVICES
Helmut Schwab, William R. Horst and Carol Stowe Van Voorhis, Dayton, and Stanley F. Coil, Washington Courthouse, Ohio, assignors to The National Cash Register Company, Dayton, Ohio, a corporation of Maryland
Filed Mar. 6, 1964, Ser. No. 349,850
8 Claims. (Cl. 40—28)

This invention relates to a cyclically-operable device for displaying data in three dimensions by writing it into and erasing it from a liquid body, and more particularly pertains to such a device involving the use of a liquid solution of photochromic dye or dyes, each dye having a normal molecular configuration which, in the preferred selected dyes, is "colorless" in solution, and having a distorted molecular "colored" configuration which is of a distinctive hue in solution, to which "colored" configuration the molecules may be forced by ultraviolet light. The molecules of these dyes en masse always are inclined to self-reversion to the normal "colorless" configuration over a period of time, and, in a mass, revert, molecule by molecule, as they are affected by environmental heat, which causes any writing in the solution to fade during a period of time depending upon the molecular composition of the dyes, the temperature of the environment, and the solvent. Such fading may be arranged to occur in a particular environment in minutes or less, hours, days, months, or longer, by a selection of appropriate component dyes, but, for the purposes of the preferred form of this invention, the dyes, the solvent, and the environmental temperature are so chosen that the apparent coloration induced by ultraviolet light remains for a few minutes to a larger fraction of an hour. The time period selected for the fading of the preferred embodiment is not to be deemed a limiting factor, as longer or shorter periods of natural fading may be "built into" the system.

The device includes means for projecting ultraviolet light, in a pattern, into a body of a liquid solution of such photochromic dye, or dyes, of substantially colorless nature, the body of liquid being held in a transparent vessel, through the walls of which vessel the colored image, to be produced, may be seen, and through which walls the exciting ultraviolet light may be projected to cause the image to appear, although, if the vessel has an open top, the color may be observed from there, or the ultraviolet light may be projected into the liquid body through the open top—or both methods of writing and observation may be used.

The ultraviolet light may be controlled for writing as shown in the drawings by a cut-out type of ultraviolet-light-opaque stencil, or by an equivalent such as a transparent film having data thereon in terms of ultraviolet-light-absorbing material, or by an ultaraviolet-light-beam source with direction-control means operable to write into the liquid body whatever data is desired. This writing is visible in the body of the liquid in three dimensions, due to the penetration of the writing light through the mass of dispersed (as by solution) molecules of the photochromic dye, the less concentrated the solution the farther the ultraviolet light penetrates. As long as the liquid body is quiescent, the written matter is seen in white incident light in its inherent color hue and pristine outlines in three dimensions, or seen in a different hue as modified by any lesser part of the spectrum represented by the incident viewing light.

A background screen of fixed reflecting characteristics may be provided against which to view the three-dimensional image, and the screen itself may be subjected to incident graphic character projection of light to supply a fixed or a moving differentially-colored background against which the three-dimensional writing may be seen.

The device includes means operable for mechanically disturbing the quiescent body of liquid, whereby the colored molecules are mixed with the uncolored remainder of the liquid body, to cause the "disappearance" of the written matter, as a function of dilution by mixing. Meanwhile, the colored molecules en masse continue to fade, so that, after extended cycles of writing-and-mixing, the body of the liquid will not build up a color-contamination. The mechanical disturbance may be caused by flow displacement of the liquid by input-output circulation of extra color-reacting liquid from a reservoir of the liquid, or by gas-bubble disturbance, or by other mechanical mixing, carried on in individually spaced periods of time, or in sequence without time spacing, or all at the same time.

Cycling writing means is provided in the preferred embodiment of the invention to first cause the written matter to appear as an image, which image persists, if not disturbed, for a determined number of seconds, this writing means being a bank of flashing ultraviolet-light-producing lamps of the xenon type, whose output is projected toward the vessel of photochromically-responsive liquid, through a stencil and a light-filter, which passes ultraviolet light but restricts visible light, interposed in the path of the projected light. After this writing means has operated, which occurs more or less instantaneously, a pause of several seconds for visual observation of the writing is provided. An erasing part of the cycle then is commenced by bubbling air or other gas through the contents of the vessel from a port in the bottom, and at the same time, or a little later, circulating fresh liquid from a hidden reservoir of the liquid, introduced by means of a pump through a conduit and another input port in the bottom of the vessel, the excess liquid being conveyed from the vessel to the reservoir through an output port at the top of the vessel, as will be described.

A background light diffuser sheet screen, such as thin paper, ordinarily is placed between the vessel and the light source filter, and should be of a material which passes ultraviolet light, although, if the viewing is not in line with the writing beam, the diffuser should be in the viewing line.

The invention provides a sequence programmer for controlling the steps carried out in the liquid solution of photochromic dye, but its use is optional and may be superseded by manual control.

While the steps of bubbling, liquid circulation, mechanical mixing, and the like have been indicated as being useful for erasing the written image, it will be apparent that Brownian movement, other support-conducted natural vibrations, and unintentionally or intentionally applied sonic and ultrasonic atmospheric vibrations may cause the gradual or immediate loss of the image, so that the existence of the image in the crisp linear form in which it is made will not last more than a matter of two or three minutes if not intentionally disturbed, but such period of image-crispness may be extended by increasing the viscosity of the solution.

With these and incidental objects in view, the preferred form of the invention will be described in the specification to follow, together with a list of equivalent photochromic-dye/solvent combinations, in conjunction with the drawings, which show a display-rendition of a retort-shaped vessel containing the liquid solution, with the auxiliary components forming an embodiment of inventive combination, but the showing in the drawings is not inteded to thereby indicate a limit to the scope of the invention. The preferred liquid solvent is di-butyl phthalate because it has the characteristics of clarity, inert solvent action on the photochromic dyes, ultraviolet and visible light transmission, stability in room environment, and the viscosity necessary for good image delineation and re-establishment of quiescence after being disturbed by the bubbling, mixing, and circulation steps. To cite specific operable materials is often presumed to limit an invention to those named as exhaustive, but no such presumption is to be made in this instance, as no chemical reaction is involved, and as such citation is made only as exemplary of thousands of compounds that are available, as set out in the United States Patents Nos. 2,953,454 (1960) Berman; 2,978,462 (1961) Berman et al.; 3,022,-318 (1962) Berman et al.; 3,072,481 (1963) Berman et al.; 3,090,687 (1963) Berman; and especially 3,100,778 (1963) Berman, which disclose candidates which may be deemed equivalents for the twenty-degree to twenty-five-degree centigrade range of normal living environment and others adaptable beyond that range. Many known compounds cited in the literature are stable temporarily in the colored form at lower or higher temperature environments, and the following are deemed eminently satisfactory in the ten-degree to forty-degree centigrade range. These compounds are the derivatives of benzo-indolino-spiropyran, having the structure

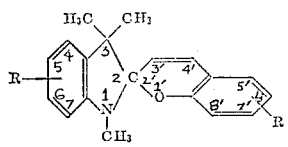

and consisting of one or a mixture of the following derivatives in solution: where R is H or Concentration/w.
(a) 6'NO$_2$ _____ .05% in di-butyl phthalate.
(b) 6'NO$_2$ _____ .05% in 90% di-butyl phthalate and 10% ethanol.
(c) 6'OCH$_3$—8'NO$_2$ ___ .05% in di-butyl phthalate.
(d) 7'NO$_2$ _____ .05% in di-butyl phthalate.
(e) 5Cl—6'NO$_2$ _____ .05% in di-butyl phthalate.
(f) 6'N—8'OCH$_3$ _____ .05% in di-butyl phthalate.

More concentrated solutions of dye may be used at the expense of limiting the penetration of ultraviolet light into the liquid body.

In the preferred embodiment of the invention, the several sheets of drawings which show the elements of the device will be used in conjunction with the specification to give an understanding of how the device is constructed and how it operates, and to give one skilled in the art a knowledge of how to practice the invention.

Figure 1:
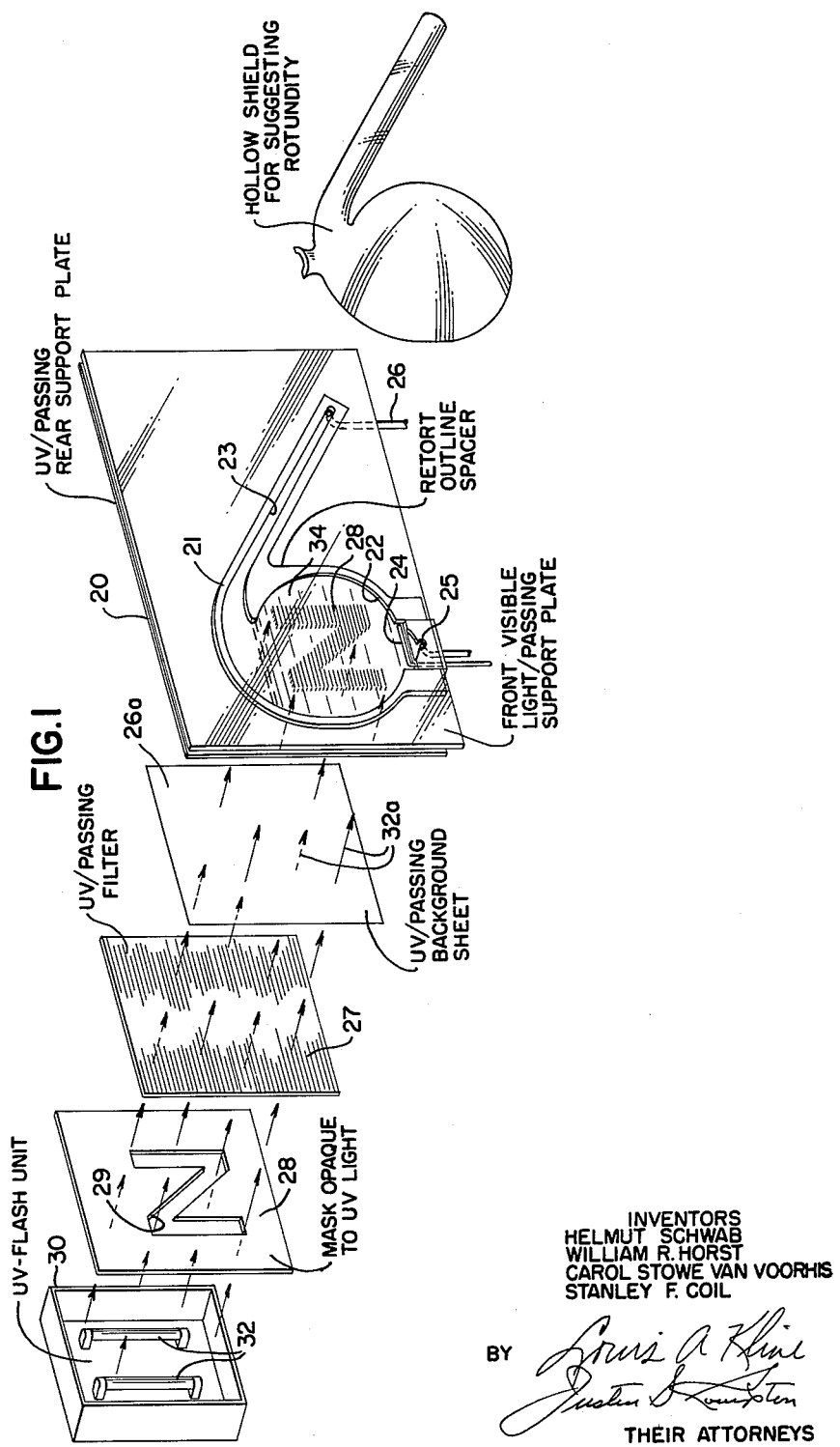
FIG. 1 is an exploded view, in perspective, of the various elements of the device, except that the auxiliary air-bubble supply and the liquid reservoir are not included, but are shown in FIG. 3.
Figure 2:
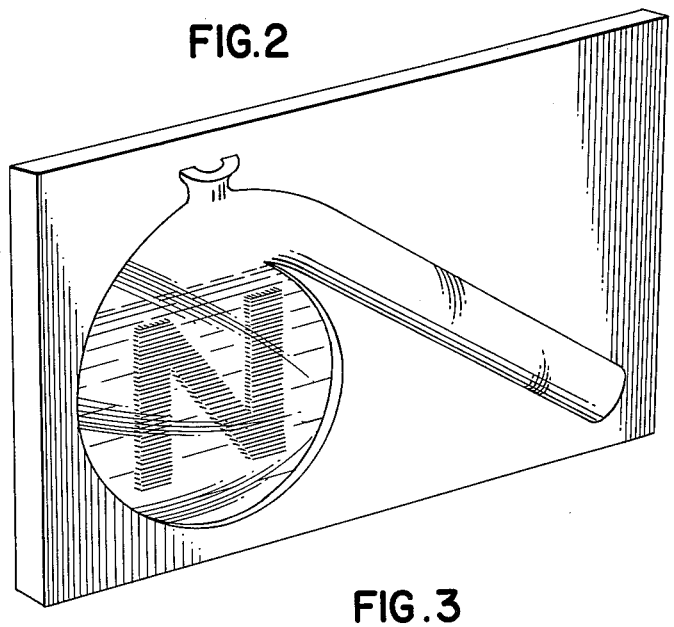
FIG. 2 is a perspective view of the fabricated retort-shaped chamber device in which the liquid solution is held, showing the three-dimensional aspect of the letter N which is written in the body of the liquid. In this drawing, the light-transparent sheet material and the spacer which make up the liquid-holding retort-like receptacle are not shown, but they appear in FIG. 1.

Referring to FIG. 1, the retort-like liquid chamber is formed from an ultraviolet-light-transparent rear plate 20, a retort-shaped spacer piece 21 forming, with a visible-light-transparent front plate, the liquid chamber 22 and overflow neck-tube 23, an air bubble input tube 24, a liquid input port 25, and an exhaust liquid tube 26, the items 24 and 25 being within the chamber limits. Just behind the rear plate 20 is a diffusing sheet 26a, of distinctive color, or of white reflectance, which may be of thin paper and which is preferably uncoated with pigment, so as to pass ultraviolet light. The sheet 26a acts as a screen for ambient visible light against which the image in the liquid held in the retort chamber may be seen, and acts to hide the light-source, the stencil, and the filter. This image 28 is shown in three dimensions, in blue-representing hatching (FIG. 1), to indicate the configuration of the cross-section of the incident ultraviolet shaft of light represented by arrows 32a passing through the background diffusing sheet 26a, an ultraviolet-light-passing filter plate 27, which may be of cobalt glass, an opaque mask with a cutout 29 representing the letter N, and an ultraviolet flash unit 30 having flash bulbs 32, which are connected to an electrical supply unit and cycling unit represented as a "timer" 33. The timer-cycling control unit 33 is shown diagrammatically in FIG. 3 and is provided to operate at intervals of a few minutes to issue an electrical pulse to fire the flash bulbs 32 (FIGS. 1 and 3).

The liquid 34, as shown in the various views, in the preferred form of the invention is a .05% concentration, by weight, of the 6'NO$_2$ derivative of the benzo-indolino-spiropyran parent compound, for which the structure has been given, in di-butyl phthalate.

Figure 3:
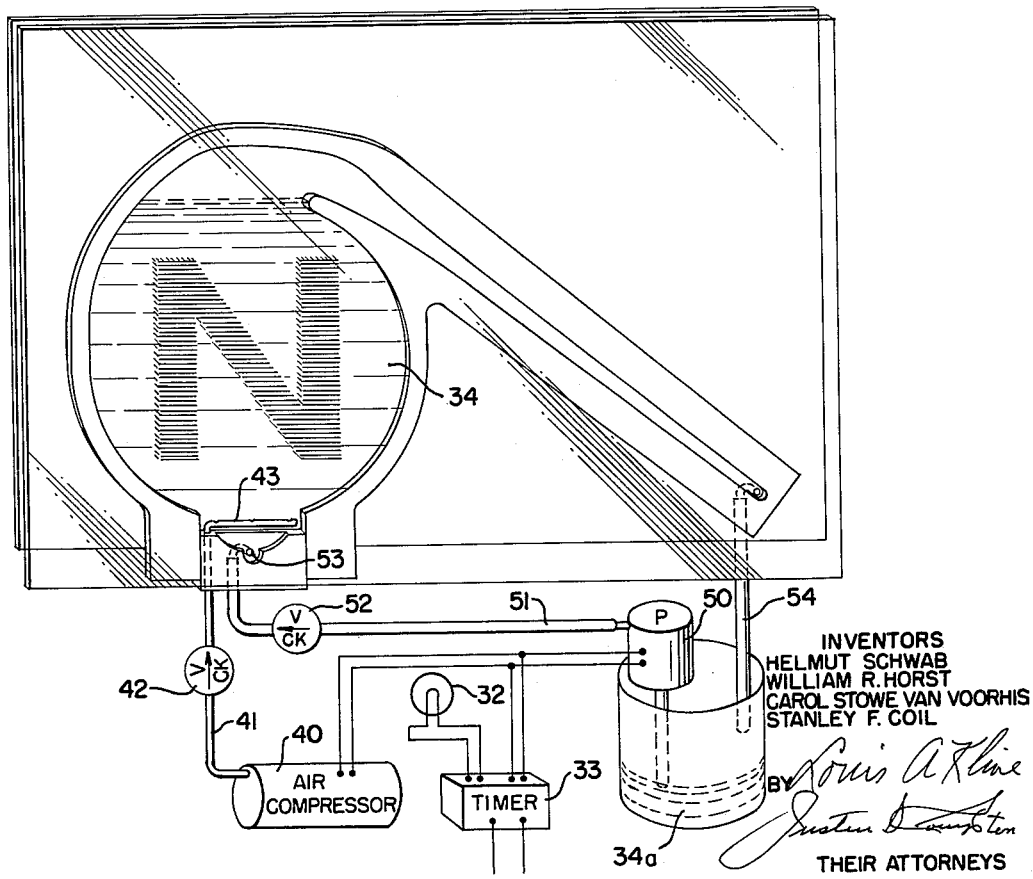
FIG. 3 is a front elevation view of what is shown in FIG. 2 with the attached air-bubble reservoir, the liquid reservoir, and the timer, which latter is shown diagrammatically, but without the hollow rotund decorative shield.
Figure 4:
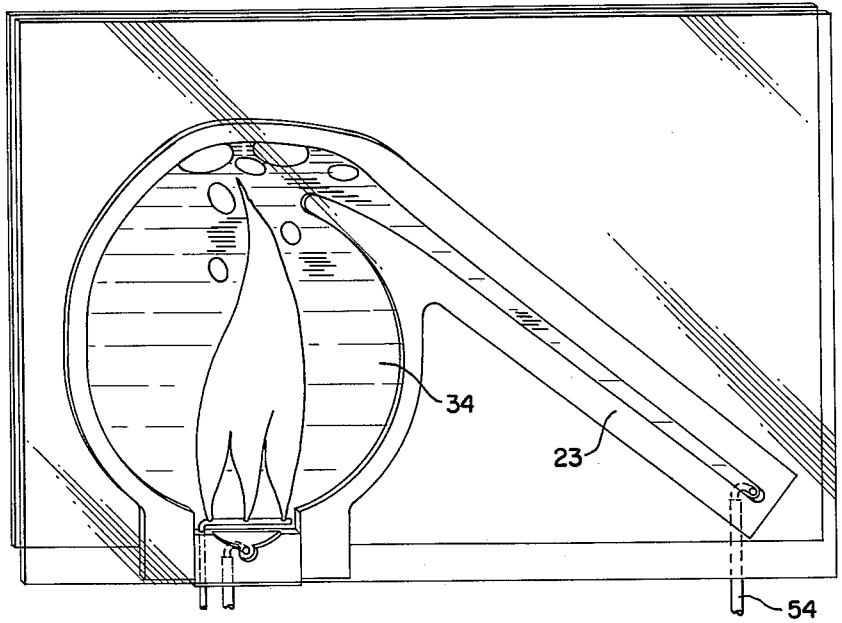
FIG. 4 is a front elevation of the bubble-chamber of FIG. 3 in operation, whereby the quiescent liquid is being disturbed both by liquid-flow and by air bubbles.

Referring to FIG. 3, there is provided an air compressor 40, which is constantly running at low pressure, with a pipe 41 leading through a check valve 42 to the perforated air bubbler 43, which valve is opened at the proper moment to cause air to bubble through the body of liquid 34 to cause the loss of the written "N" image by mechanical disturbance. At, near, subsequently to, or before the mechanical disturbance, the solution in the reservoir 34a is pumped, by a pump 50, through a tube 51, a check valve 52, and the port 25 to cause the liquid to overflow, as shown in FIG. 4, down the overflow pipe 23 back into the reservoir through a pipe 54 (see also FIG. 3). FIG. 4 also shows the stream of air bubbles and its effect on taking part in the dissipation of the colored image.

Inasmuch as normal room temperature environment varies between fifteen degrees centigrade and thirty degrees centigrade, and the photochromic dyes in liquid solution are sensitive to temperature, fading faster at the higher temperature and slower at the lower temperature, artificial cooling or heating means may be employed to vary the temperature of the reservoir-held liquid to accommodate for ambient temperature fluctuation, or to adjust the system for the fading rate of the selected photochromic dyes.

Figure 5:
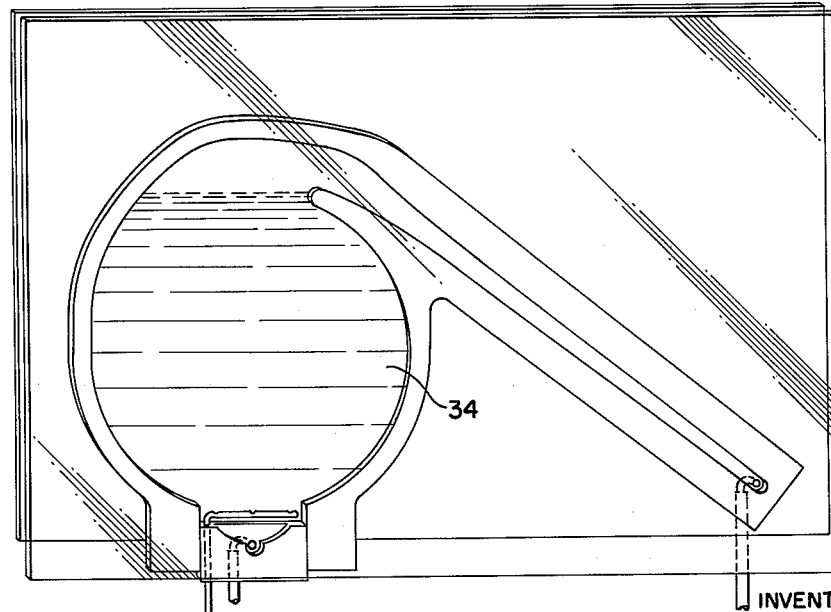
FIG. 5 shows the liquid in quiescent repose as it would be at the beginning of a cycle of operation, with no data being seen therein and with the liquid at rest by levelling with the overflow port and tube of the chamber.

FIG. 5 shows the quiescent body of liquid 34 as it appears before the beginning of a cycle.

The particular details of the air compressor, the timer, and the check valves are not shown, inasmuch as they are of the common variety, well known in the art, which of themselves have no inventive features which contribute to this invention.

It is apparent that the dyes may be selected as desired, singly or in combination, to gain any effect in the way of coloration or degree of persistence which it is desired to have in the system, and that the timer and the air compressor may be selected and adjusted for varying the time of the image-forming cycle. In actual commercial use, the body of liquid may be contained in any chamber supplied with input and output ports, the retort shape of the embodiment shown in the drawings being in no way deemed to limit the invention in respect to its utility, and it is within the inventive concept to supply a number of vessels or chambers of any shape, or of different shapes, which act in concert as an aggregation to effect a series of images at once, or in succession in time, as may be appropriate to the display that it is desired to make.

It is also within the concept of the invention to apply the exciting ultraviolet light by means of a movable beam which may trace a pattern in the liquid body, which trace persists as a function of time, and its movement may follow an irregular course through the liquid not to represent any single character, but to represent a continuing phenomenon, such as changing data, and such will show the course of such graphic movement as a gradually fading trace, after which the subject matter can be erased by manually controlling the check valves, as desired. In this respect, it will be understood that the check valves are equipped with regular stop cocks which may be manually as well as automatically controlled, and therefore the invention will be claimed broadly with respect to the subordinate means for bubbling a gas through the body of liquid in which the image is caused to disappear, and as to means for adding liquid from the reservoir to displace a full chamber of liquid gradually through overflow means to cause the image to disappear, as well as to the whole combination of means.

What is claimed is:

1. A display device including in combination
   (a) a vessel containing a body of liquid that is colorable in hue by incident ultraviolet light, said hue fading during a period of time, the colored hue being visibly but fadingly perceptible during said period;
   (b) means operable to project a patterned beam of ultraviolet light into said body of liquid to make a corresponding colored image in the body of liquid; and
   (c) image deletion means operable to bubble gas through the body of the liquid to disturb the colored image and cause its loss by dilution with the uncolored part of the liquid body.

2. A display device including in combination
   (a) a vessel containing a body of liquid comprising photochromic molecules colorable in hue by incident ultraviolet light, said hue fading during a known time period, the colored hue being visibly but fadingly perceptible during said period;
   (b) means to project a patterned beam of ultraviolet light into said body of liquid to make a corresponding colored image in the body of liquid; and
   (c) image deletion means, including an extra supply of the liquid, for displacing the liquid in the vessel, thus carrying away the image by mixing and dilution.

3. The device of claim 2 in which the image deletion means includes a reservoir connected to the vessel for storing the displacing liquid, into which reservoir the displaced liquid is returned for fading and storage for re-use.

4. The device of claim 3 in which the reservoir is connected by a pump and a liquid conduit to the vessel, for returning the stored liquid to the vessel, whereby by operating the pump the liquid is circulated from the reservoir into the vessel and back to the reservoir.

5. The device of claim 1 in which a second image deletion means, including an extra supply of the liquid, is provided, for displacing the liquid in the vessel; and means is provided for displacing the colored liquid with the extra supply, whereby both the bubbling gas and the liquid displacement image deletion means may be used to restore the device for the reception of another image.

6. The device of claim 5 in which a timing means is provided to cause the ultraviolet beam projection means to operate, followed by operation of the image deletion means.

7. A display device including, in combination,
   (a) a vessel transparent to visible and ultraviolet light;
   (b) a body of liquid normally held in quiescence in the vessel, said liquid having dissolved in it a normally substantially colorless photochromic dye, whereby the liquid is colored wherever it is subjected to ultraviolet light, which color persists as a visible distinctive hue for a period of time during which said colored liquid fades so as finally to become invisible;
   (c) means to project a shaft of ultraviolet light through the liquid in the vessel, said shaft being of a distinctive pattern in cross-section so as to create a trail of the same cross-section through the liquid in the vessel as a three-dimensional image, in said distinctive hue, but subject to definition loss by fading and disturbing liquid movement after a period of perceptible existence; and
   (d) positive image deletion means operable to disturb the quiescent condition of the liquid to destroy the image.

8. A display device including, in combination,
   (a) a body of liquid containing photochromic molecules in liquid solution held in a vessel that is transparent to ultraviolet and visible light, which molecules become temporarily colored when struck by a flash of ultraviolet light, said color persisting for a perceptible time after cessation of the flash so as to be visible from outside the vessel by reflection of ambient light;
   (b) means to flash the body of liquid with an image-representing pattern of ultraviolet light, to form an image; and
   (c) two means to destroy the image before it fades,
      (1) one of said two means being means to mechanically disturb the quiescence of the liquid body, and
      (2) the other of said two means being a hydraulic means to replace the liquid with more of the same kind.

References Cited by the Examiner

UNITED STATES PATENTS

| | | | |
|---|---|---|---|
| 1,004,503 | 9/1911 | Troy | 40—134 X |
| 1,428,639 | 9/1922 | Junghans | 40—326 |
| 1,592,393 | 7/1926 | Sulzberger | 40—134 X |
| 1,934,419 | 11/1933 | Gauthier | 40—130 |
| 2,486,859 | 11/1949 | Meijer | 40—134 |
| 3,200,525 | 8/1965 | Francis | 40—106.22 X |

EUGENE R. CAPOZIO, *Primary Examiner.*

WENCESLAO J. CONTRERAS, *Assistant Examiner.*